United States Patent
Adams et al.

(10) Patent No.: US 8,787,388 B1
(45) Date of Patent: Jul. 22, 2014

(54) SYSTEM AND METHODS FOR FORWARDING PACKETS THROUGH A NETWORK

(75) Inventors: Robert Edward Adams, San Mateo, CA (US); Mandeep Singh Dhami, San Jose, CA (US); Kanzhe Jiang, Los Altos Hills, CA (US)

(73) Assignee: Big Switch Networks, Inc., Mountain View, CA (US)

( * ) Notice: Subject to any disclaimer, the term of this patent is extended or adjusted under 35 U.S.C. 154(b) by 205 days.

(21) Appl. No.: 13/220,431

(22) Filed: Aug. 29, 2011

(51) Int. Cl.
*H04L 12/28* (2006.01)
*H04L 12/56* (2006.01)
*H04L 29/06* (2006.01)

(52) U.S. Cl.
CPC ............ *H04L 45/54* (2013.01); *H04L 65/102* (2013.01); *H04L 29/06176* (2013.01)
USPC ...... 370/395.31; 370/353; 370/354; 370/392; 370/244

(58) Field of Classification Search
USPC ......... 370/252, 392, 352, 353, 354, 355, 356, 370/360, 363, 386, 395.31, 395.523, 395.54
See application file for complete search history.

(56) References Cited

U.S. PATENT DOCUMENTS

| | | | | |
|---|---|---|---|---|
| 5,828,844 | A * | 10/1998 | Civanlar et al. | 709/228 |
| 6,084,864 | A * | 7/2000 | Liron | 370/316 |
| 6,421,321 | B1 * | 7/2002 | Sakagawa et al. | 370/238.1 |
| 6,781,994 | B1 * | 8/2004 | Nogami et al. | 370/395.1 |
| 7,130,385 | B1 * | 10/2006 | Moon | 379/45 |
| 7,342,890 | B1 * | 3/2008 | Ferguson | 370/238 |
| 7,408,935 | B2 * | 8/2008 | Yazaki et al. | 370/392 |
| 7,434,254 | B1 * | 10/2008 | Foschiano et al. | 726/13 |
| 7,583,665 | B1 * | 9/2009 | Duncan et al. | 370/389 |
| 7,707,300 | B1 * | 4/2010 | Champagne | 709/231 |
| 7,961,727 | B2 * | 6/2011 | Duncan et al. | 370/389 |
| 2004/0202184 | A1 * | 10/2004 | Yazaki et al. | 370/395.31 |
| 2006/0142008 | A1 * | 6/2006 | Lee et al. | 455/436 |
| 2008/0239956 | A1 | 10/2008 | Okholm et al. | |
| 2009/0265459 | A1 * | 10/2009 | Hikichi et al. | 709/224 |
| 2009/0310582 | A1 | 12/2009 | Beser et al. | |
| 2010/0014518 | A1 * | 1/2010 | Duncan et al. | 370/390 |

(Continued)

OTHER PUBLICATIONS

Pfaff et al., OpenFlow Switch Specification, Dec. 31, 2009, 42 pages.

(Continued)

*Primary Examiner* — Ian N Moore
*Assistant Examiner* — Phong La
(74) *Attorney, Agent, or Firm* — Treyz Law Group; Chih-Yun Wu; Michael H. Lyons

(57) ABSTRACT

Network packets may be transmitted from packet sources to packet destinations through a network of switches. The switches may have corresponding flow tables that control how the packets are forwarded through the switches. A controller server may generate network switch forwarding paths for the network packets by modifying the flow tables with entries based on attributes of the network packets and network topology information. The controller server may forward selected packets directly to packet destinations instead of generating the network switch forwarding paths. To determine which packets to directly forward, the controller server may calculate cost metrics associated with the network switch forwarding paths and associated with forwarding network packets directly to packet destinations. The cost metrics may be calculated based on network topology information, network traffic conditions, controller server processing load, packet forwarding delays, an expected number of future network packets, or attributes of the network packets.

23 Claims, 15 Drawing Sheets

(56) References Cited

U.S. PATENT DOCUMENTS

| | | | | |
|---|---|---|---|---|
| 2010/0290343 | A1* | 11/2010 | Tanaka et al. | 370/235 |
| 2011/0069621 | A1 | 3/2011 | Gintis et al. | |
| 2011/0280250 | A1* | 11/2011 | Inoue | 370/401 |
| 2012/0327836 | A1* | 12/2012 | Narayanasamy | 370/312 |
| 2013/0003735 | A1* | 1/2013 | Chao et al. | 370/392 |
| 2013/0039214 | A1* | 2/2013 | Yedavalli et al. | 370/254 |
| 2013/0107885 | A1* | 5/2013 | Kotalwar et al. | 370/392 |

OTHER PUBLICATIONS

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Appenzeller, U.S. Appl. No. 12/971,924, filed Dec. 17, 2010.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet<URL: http://openflowswitch.org/downloads/technicalreports/openflow-tr-2009-1-flowvisor.pdf.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

| PROTOCOL | EXPECTED NUMBER OF PACKETS IN EACH FLOW |
|---|---|
| DHCP | 4 |
| ARP | 2 |
| DNS/UDP | 2 |
| DNS/TCP | 6 |
| * | ∞ |

FIG. 10

SYSTEM AND METHODS FOR FORWARDING PACKETS THROUGH A NETWORK

BACKGROUND

This relates to communication networks, and more particularly, to routing data traffic through a communications network.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented may include a flow table with entries that specify how packets are to be forwarded by that switch. A controller server may route traffic through the network by modifying the flow tables of the network switches to create data paths. For example, the controller may communicate with each network switch associated with a desired path to route a data packet from a packet source to a packet destination. If care is not taken, network packets transmitted between the controller and network switches may adversely affect the performance of the network.

It would therefore be desirable to be able to provide improved arrangements for routing traffic in a communications network by configuring and controlling the network switches in the communications network.

SUMMARY

A packet based network may be formed from network switches that are coupled via network connections. The network switches may include controller clients that are controlled by a controller server. Network switches that contain controller clients may be referred to as client switches. The controller server and the client switches may use network protocol stacks to communicate over network connections.

Each controller client may have a corresponding flow table. The flow tables may include entries that direct the client switches to forward incoming network packets to predetermined ports based on attributes of the network packets such as packet sources, packet destinations, or network protocols. End hosts that are coupled to the network switches may communicate with other end hosts by transmitting network packets through the network. The controller server may generate (establish) network switch forwarding paths (e.g., packet forwarding paths) for the network packets by modifying the flow tables with entries based on attributes of the network packets and network topology information.

The controller server may forward selected packets directly to packet destinations instead of generating network switch forwarding paths. To determine which packets to directly forward, the controller server may calculate cost metrics associated with the network switch forwarding paths and associated with forwarding network packets directly to packet destinations. The cost metrics may be calculated based on network topology information, network traffic conditions, controller server processing load, packet forwarding delays, an expected number of future network packets, or attributes of the network packets.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 10 is an illustrative table that may identify expected number of packets associated with data flows in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
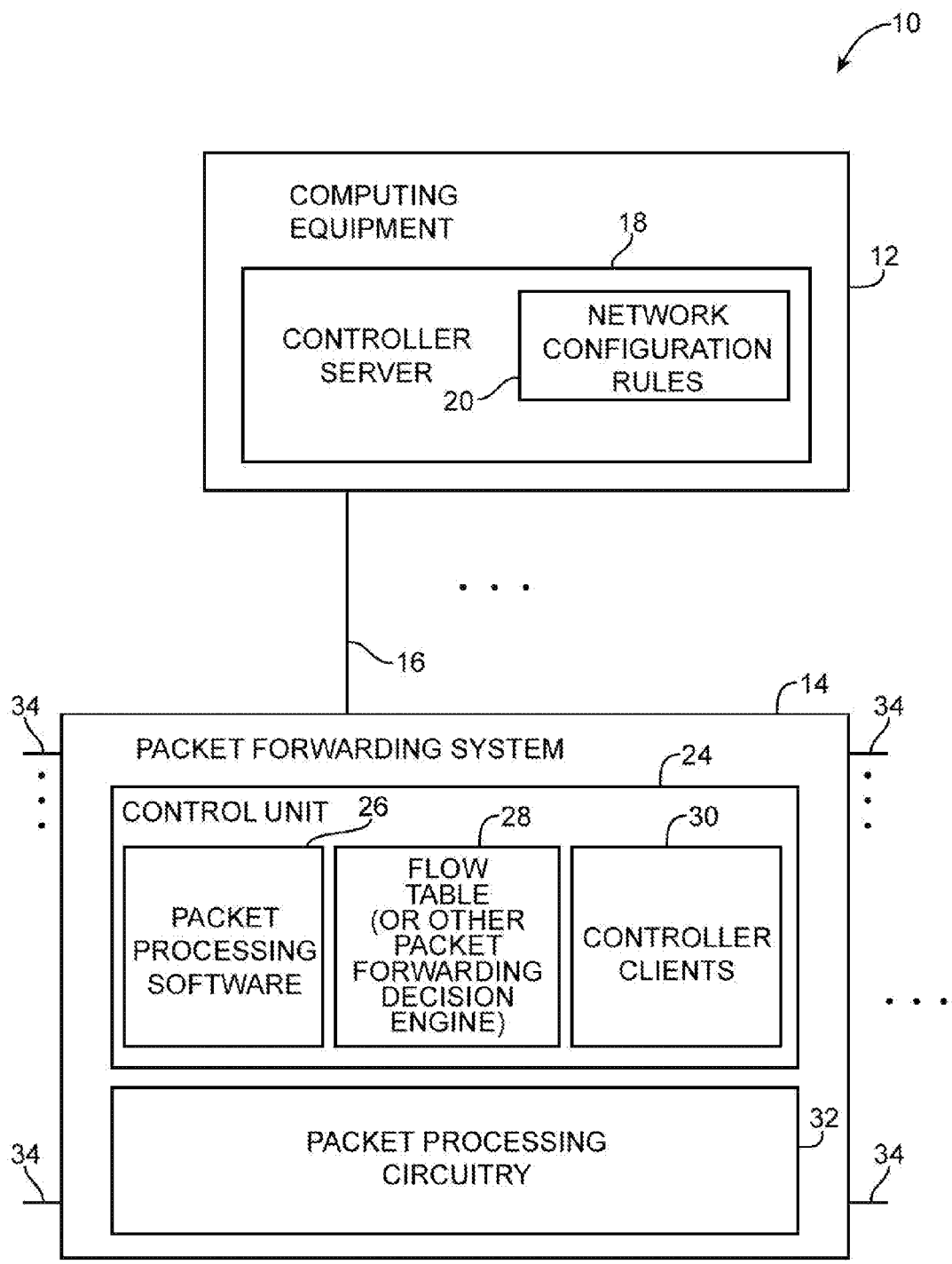
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 10 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example. Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
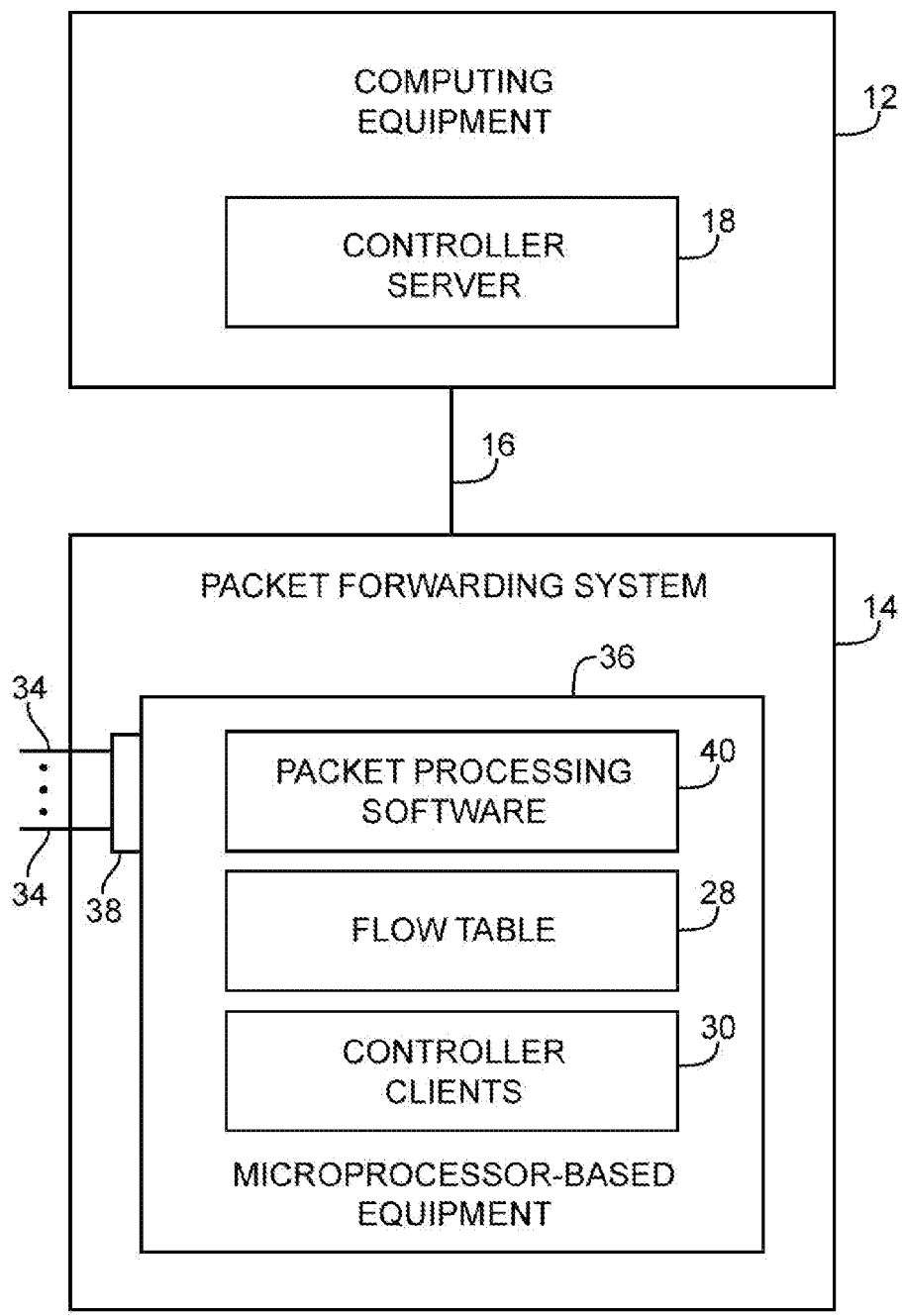
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
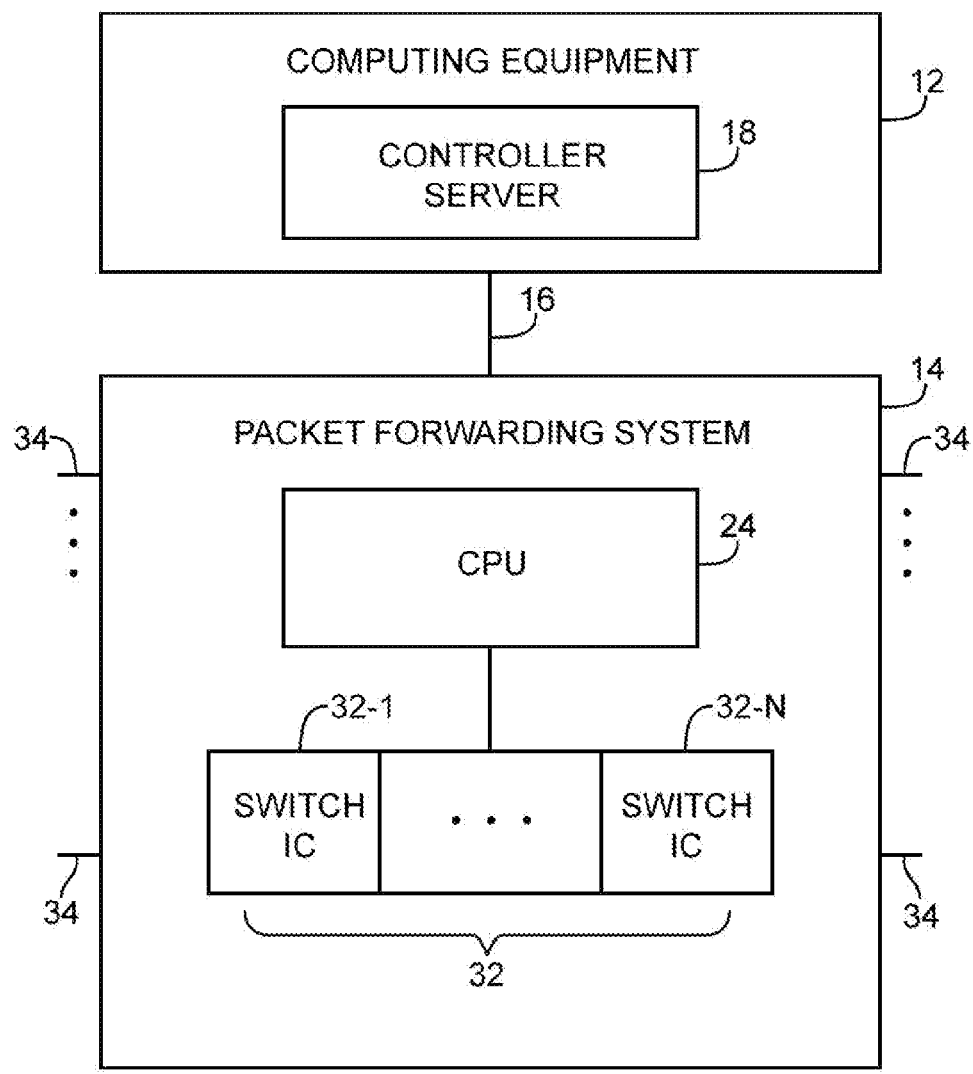
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
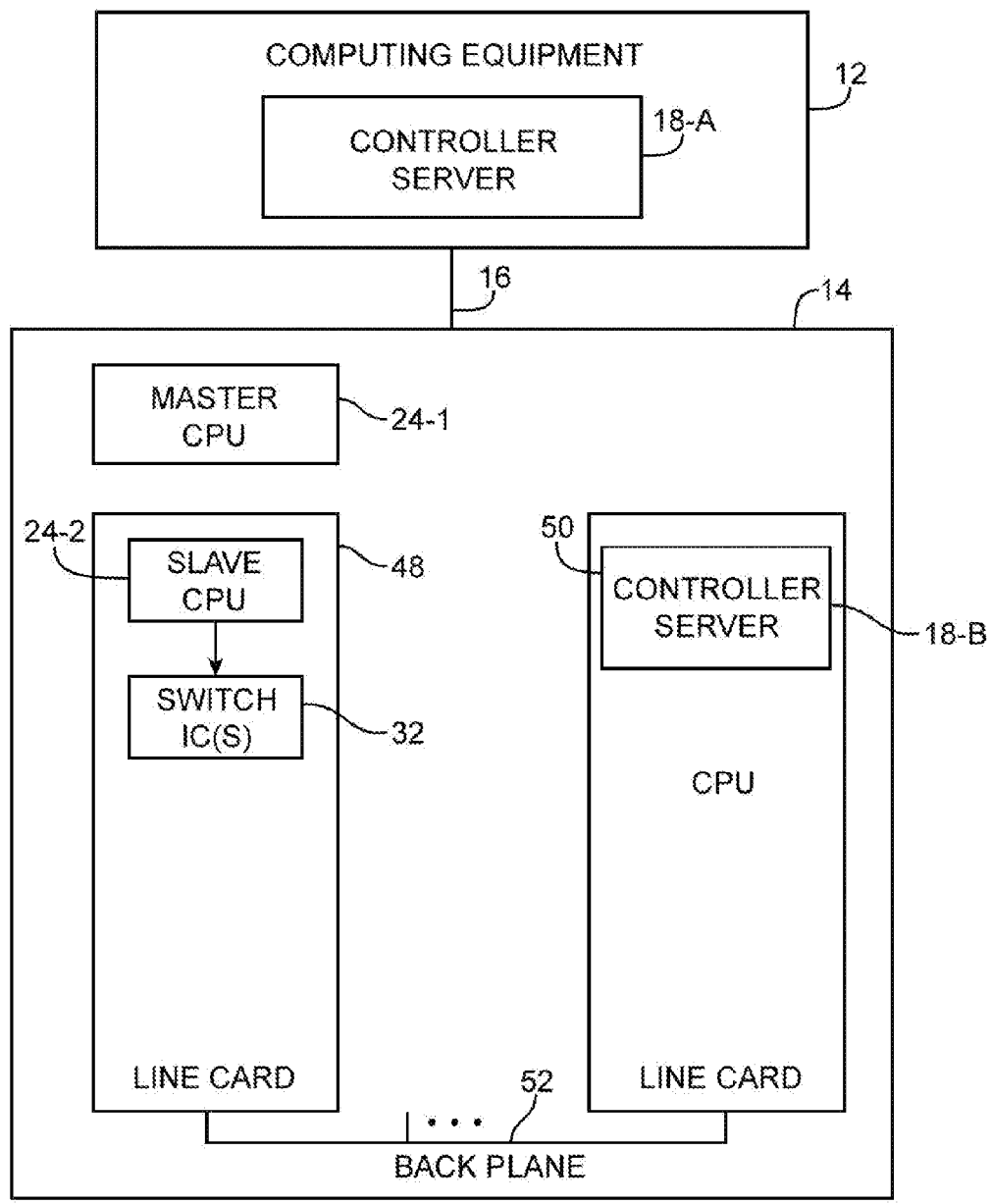
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
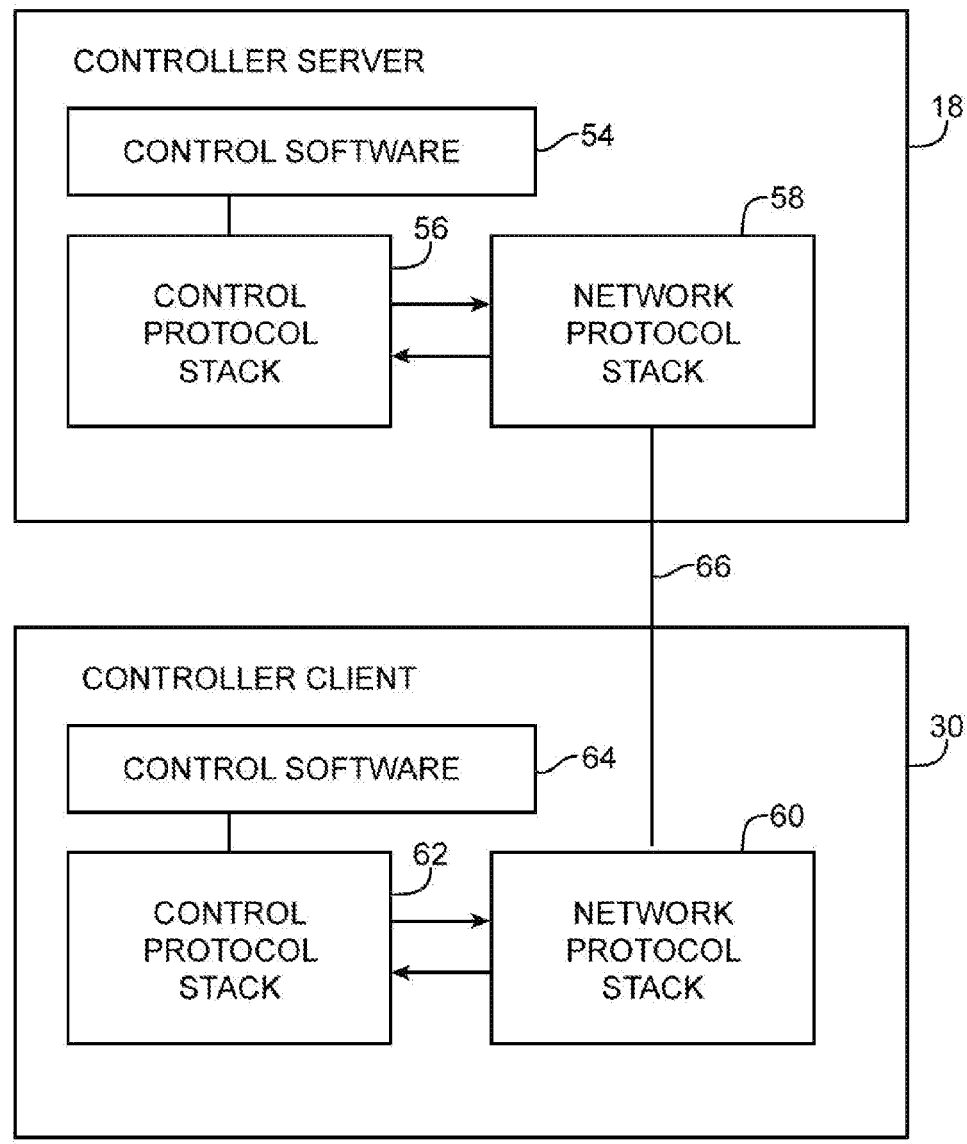
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
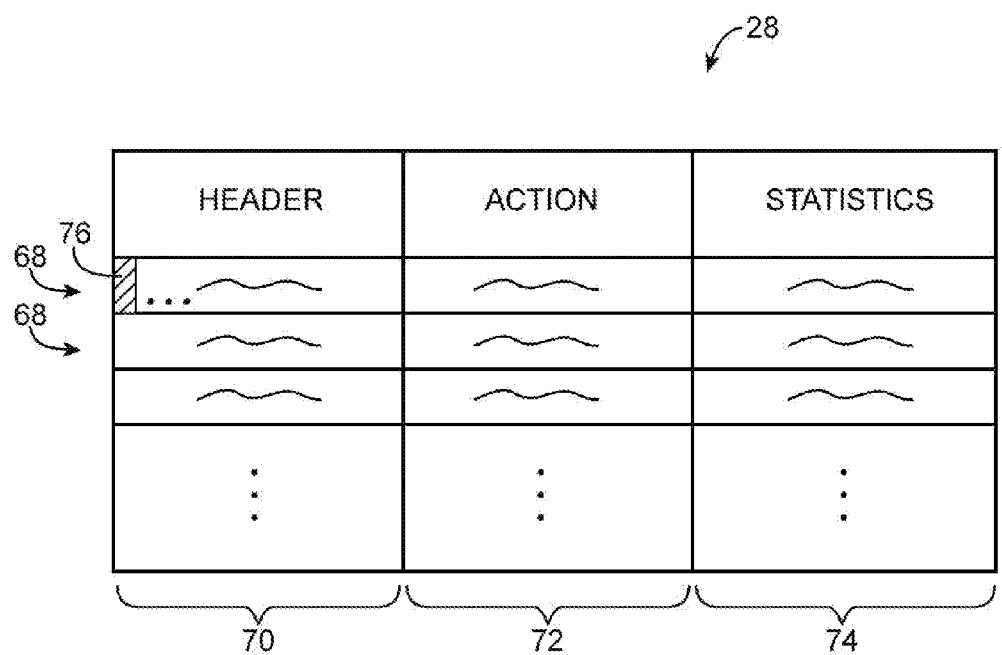
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
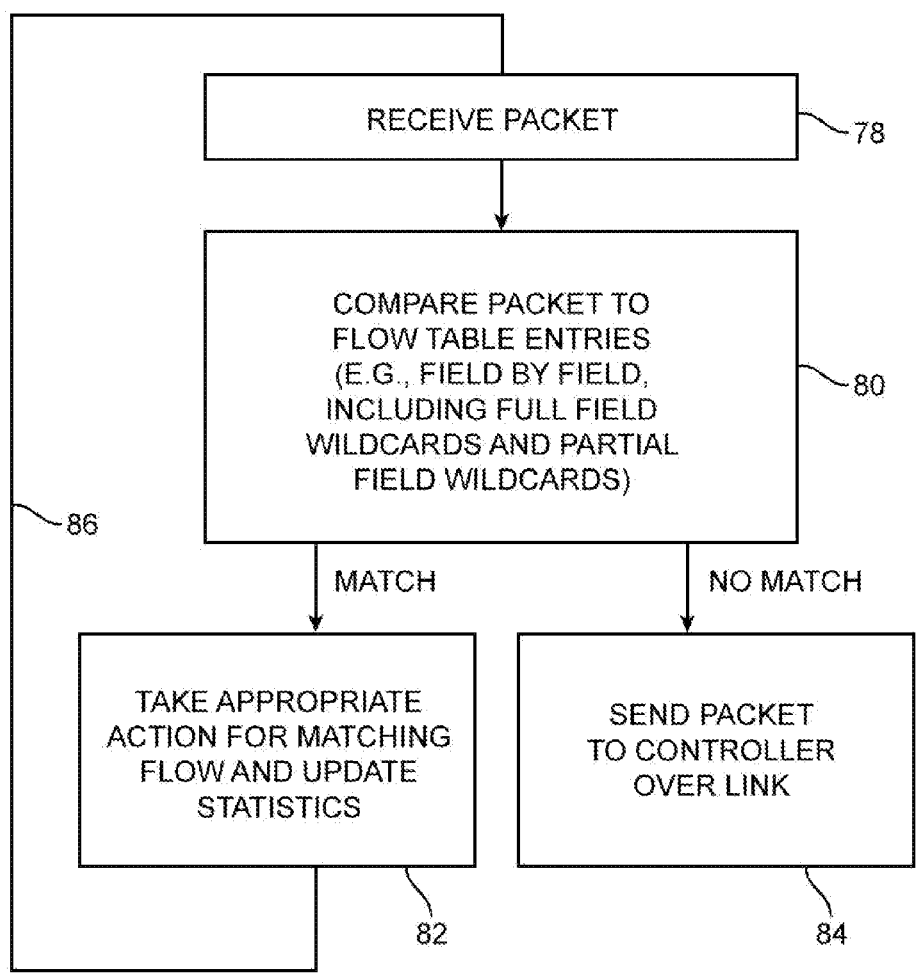
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Operation of a data network by controller servers that communicate with controller clients may incur operational costs that are associated with network control traffic between the controller servers and the controller clients. For example, control packets may be sent from a controller server to corresponding controller clients through the network and increase network traffic. Network control traffic may also cause congestion of the network connections between the controller server and the controller clients (e.g., because the network connections between the controller server and the controller clients may become saturated with control packets).

As another example, forwarding of data packets through the data network may be delayed by the time required for a controller server to generate a desired data path for the data packets (e.g., to generate a data path by modifying the flow tables of switches in the desired data path). The generated data path may sometimes be referred to herein as network switch forwarding paths, network switch paths, or packet forwarding paths. In some scenarios, the delay caused by setup of network switch forwarding paths may significantly delay communications between end hosts.

To reduce network overhead costs associated with the setup of network switch forwarding paths between end hosts, it may be desirable to route selected network packets through the controller server instead of forwarding the selected network packets through a network switch forwarding path.

Figure 8:
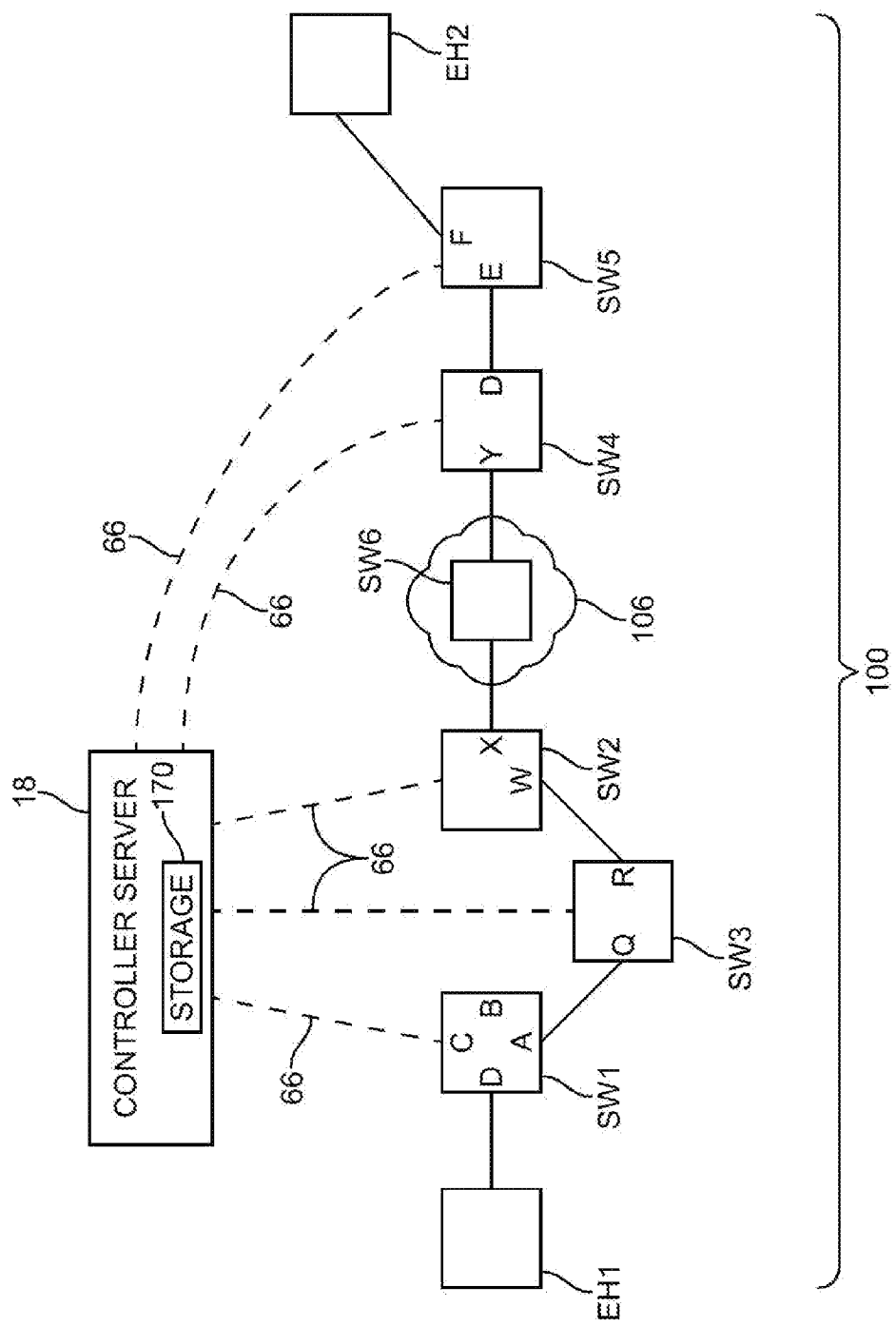
FIG. 8 is a diagram of a network with a controller server that may communicate with controller clients to generate a network switch path between first and second end hosts in accordance with an embodiment of the present invention.

FIG. 8 is a diagram of an illustrative network 100 with multiple network switches and a controller server 18 that may route selected packets through controller server 18. Network switches SW1, SW2, SW3, SW4, and SW5 may contain controller clients that communicate with controller server 18 through network paths 66. Network switches that communicate with controller server 18 may herein be referred to as client switches. Switches such as switch 106 do not contain a controller client that communicates with controller server 18 and are not configured by controller server 18. Switches such as switch 106 are therefore sometimes referred to as switches without controller clients (non-client switches).

In the illustrative network shown in FIG. 8, a first end host EH1 may be communicating with a second end host EH2. End hosts EH1 and EH2 may be computers (e.g., personal computers), servers, clusters of computers, set-top boxes, handheld devices, or any other computing equipment. During part of the communications between end hosts 88, the first end host may be serving as a packet source and the second end host may be serving as a packet destination. At other times, roles may be reversed, so that the second end host is serving as a packet source while the first end host is serving as a packet destination.

Sequences of network packets may be grouped based on a desired combination of packet sources, packet destinations, and attributes associated with the network packets (e.g., network protocols associated with the network packets). For example, a sequence of network packets transmitted between end host EH1 and end host EH2 using the address resolution protocol (ARP) may form a first group and a sequence of network packets transmitted between end host EH1 and end host EH2 using the transport control protocol (TCP) may form a second group. A group of network packets identified by a packet source, packet destination, and other attributes may sometimes be referred to herein as a flow.

The number of data packets in each flow may vary depending on the network protocol associated with that flow. For example, a flow between end host EH1 to request a network address of a second end host using the address resolution protocol (ARP) may include two network packets (e.g., a request packet from EH1 that requests the network address of EH2 and a reply packet from EH2 that includes the network address of EH2). As another example, a flow between end host EH1 that wishes to send a relatively large file (e.g., an audio or video file) to end host EH2 using the transmission control protocol (TCP) may include thousands of packets (or more). These examples are merely illustrative. End hosts that communicate over a data network may communicate over data network 100 using various protocols. For example, end hosts may use the transmission control protocol (TCP), user datagram protocol (UDP), internet control message protocol (ICMP), dynamic host configuration protocol (DHCP), domain name system (DNS), or other protocols that operate on packet based networks (e.g., internet protocol (IP) networks).

Figure 9A:
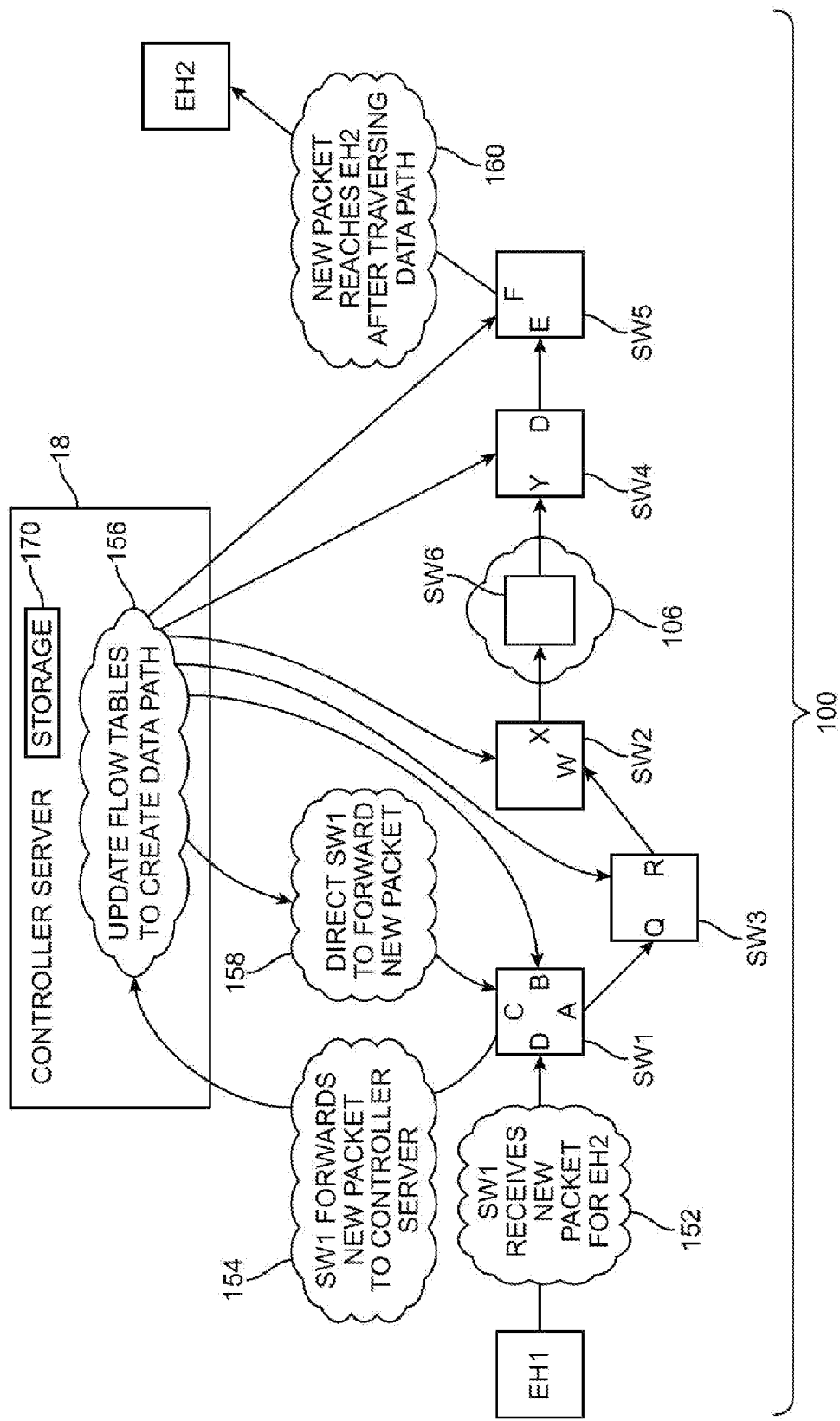
FIG. 9A is a diagram showing illustrative steps that may be performed by a controller server and controller clients to forward a data packet through the controller server in accordance with an embodiment of the present invention.

FIG. 9A shows illustrative steps involved in transmitting a new packet (e.g., the first packet of a flow) from end host EH1 to end host EH2 over network 100.

In step 152, client switch SW1 may receive the new packet from packet source EH1. Switch SW1 may identify that the packet is destined for end host EH2 and examine a corresponding flow table (e.g., flow table 28 of FIG. 1) to identify an appropriate action to take. As an example, switch SW1 may perform the steps of FIG. 7 and identify that no flow table entry exists for the new packet (e.g., because controller server 18 has not yet generated a network switch forwarding path between end hosts EH1 and EH2).

In step 154, client switch SW1 may forward the new packet to controller server 18 (e.g., via path 66 of FIG. 8). For example, client switch SW1 may forward the new packet to controller server 18 in response to identifying that no flow table entry exists for the new packet or in response to identifying a flow table entry that directs client switch SW1 to forward the new packet to controller server 18.

In step 156, controller server 18 may identify a network path between end hosts EH1 and EH2 based on network topology information and modify the flow tables of client switches in the identified network path to generate a corresponding network switch forwarding path. To modify the flow tables of the client switches, controller server 18 may transmit control packets to the client switches. For example, controller server 18 may send a control packet to each of the client switches that modifies the flow table for that client switch to generate the network switch routing path. In this scenario, the control packets may add a flow table entry to switch SW1 to forward the new packet out of port A, add an entry to switch SW3 to forward the new packet out of port R, add an entry to switch SW2 to forward the new packet out of port X, add an entry to switch SW4 to route the new packet out of port D, and add an entry to switch SW5 to route the new packet out of port F. The network topology information may be retrieved from databases in storage 170 and may be updated to correspond to changes in the network topology (e.g., based on changes to network links between switches, end hosts, and other network elements).

In step 158, controller server 18 may direct client switch SW1 (e.g., the first switch in the network switch forwarding path generated in step 154) to forward the new packet along the network path. For example, controller server 18 may send a control packet to switch SW1 that directs switch SW1 to transmit the new packet out of port A. The new packet may then be forwarded by the client switches through network 100 based on the updated flow tables corresponding to each client switch.

In step 160, the new packet may reach end host EH2 after traversing the network switch forwarding path (e.g., after traversing switches SW1-SW6).

Forwarding new packets through network switch forwarding paths (e.g., as shown in FIG. 9A) to transmit a new packet from end host EH1 to end host EH2 via client switches in network 100 may incur network costs associated with delay of transmitting the packet, increased network traffic, and other factors. For example, the control packets sent by controller server 18 in step 156 may be burdensome to the network and may unnecessarily delay the transmission of the packet.

To estimate the cost of transmitting a new packet through a network switch forwarding path (e.g., by forwarding the new packet through client switches in a network), the cost metric of equation 1 may be calculated.

$$\text{cost}_{data} = \text{cost}_{flow\ table\ setup} + \text{cost}_{instructing\ first\ switch\ to\ forward\ new\ packet} + \text{cost}_{additional\ flow\ table\ entries} + \text{cost}_{forwarding\ delay\ of\ client\ switches} \quad (1)$$

As shown by equation 1, the cost of transmitting the new packet through a network switch forwarding paths ($\text{cost}_{data}$) includes the cost of setting up flow tables to generate the forwarding path, the cost of instructing the first switch in the network path to forward the new packet along the forwarding path, the cost of additional flow table entries, and the cost of delay from traversing the client switches.

The cost of setting up flow tables to generate the data path (e.g., as described in step 156) and the cost of instructing the first switch in the network path to forward the new data packet (e.g., the cost of performing step 158) may account for controller server load (e.g., a current capacity of the controller server to perform additional tasks), the additional network traffic of the control packets sent from the controller server to each client switch in the data path, and the delay from sending the control packets.

For example, if the controller server is concurrently processing many data packets, the controller server many be unable to immediately perform the tasks necessary to update the flow tables. In this scenario, the cost of setting up flow tables ($cost_{flow\ table\ setup}$) and the cost of instructing the first switch to forward the new packet ($cost_{instructing\ first\ switch\ to\ forward\ new\ packet}$) may be increased.

The cost of additional flow table entries may reflect current flow table capacities of the switches. For example, additional flow table entries generated in step 156 may exceed the storage capacity of one or more of the flow tables. In this scenario, the additional flow table entries may overwrite other flow table entries or be dropped from the flow tables. Due to missing flow table entries, the network switches may be unable to correctly forward network packets and network operations may be disrupted.

The cost due to forwarding delay through the client switches in the network switch forwarding path may correspond to the time required for each switch to process and forward the new packet in sequence. For example, the forwarding delay cost may be the sum of time required for each switch to examine a corresponding flow table, to determine a port from which the new packet should be forwarded, and to forward the new packet through the port to the next switch. Client switches in the data path that are separated by non-client switches may have increased forwarding delay costs. For example, client switch SW2 may be separated from client switch SW4 by a non-client switch SW6. In this scenario, the forwarding delay cost associated with client switch SW2 may include the time required for the new packet to traverse non-client switch SW6.

The examples of FIG. 9A and equation 1 illustrate costs associated with transmitting a new packet (e.g., the first packet in a flow). Equation 2 shows an illustrative cost function that may be calculated to estimate the cost function of subsequent packets in a flow. As shown in equation 2, subsequent packets of the same flow may have reduced costs, because network setup procedures may have already been performed in response to the first packet (e.g., the subsequent packets may be forwarded based on the flow table entries that were generated for the first packet). For example, a flow may consist of a sequence of two network packets transmitted between end host EH1 and end host EH2 using the address resolution protocol (ARP). The first ARP packet of the flow (e.g., an ARP request packet transmitted from end host EH1 to end host EH2) may have an associated cost represented by equation 1. However, the second ARP packet of the flow (e.g., an ARP reply packet transmitted from end host EH2 to end host EH1) may have the reduced network cost ($cost_{data}'$)) associated with only the forwarding delay cost.

$$cost_{data}' = cost_{forwarding\ delay\ of\ client\ switches} \quad (2)$$

The total cost associated with a flow may be estimated based on an expected number of packets associated with the flow and based on the cost functions of equations 1 and 2. Equation 3 shows an illustrative cost function for estimating the cost ($flow\_cost_{data}$) of forwarding the network packets of an entire flow through a network switch forwarding path.

$$flow\_cost_{data} = cost_{data} + (num_{expected\ packets} - 1)*cost_{data}' \quad (3)$$

As shown in equation 3, $flow\_cost_{data}$ may be equal to the sum of the cost of the first packet in the flow ($cost_{data}$) and the expected number of remaining packets in the flow multiplied by the cost of each of the remaining packets ($cost_{data}'$). The initial cost (e.g., $cost_{data}$) of transmitting the first network packet through the network switch forwarding path may be relatively high (e.g., including network setup costs), while the cost of subsequent network packets ($cost_{data}'$) may be relatively low. Therefore, for flows that include relatively few network packets, the high initial cost may account for a relatively large proportion of the total cost of transmitting the flow.

Figure 9B:
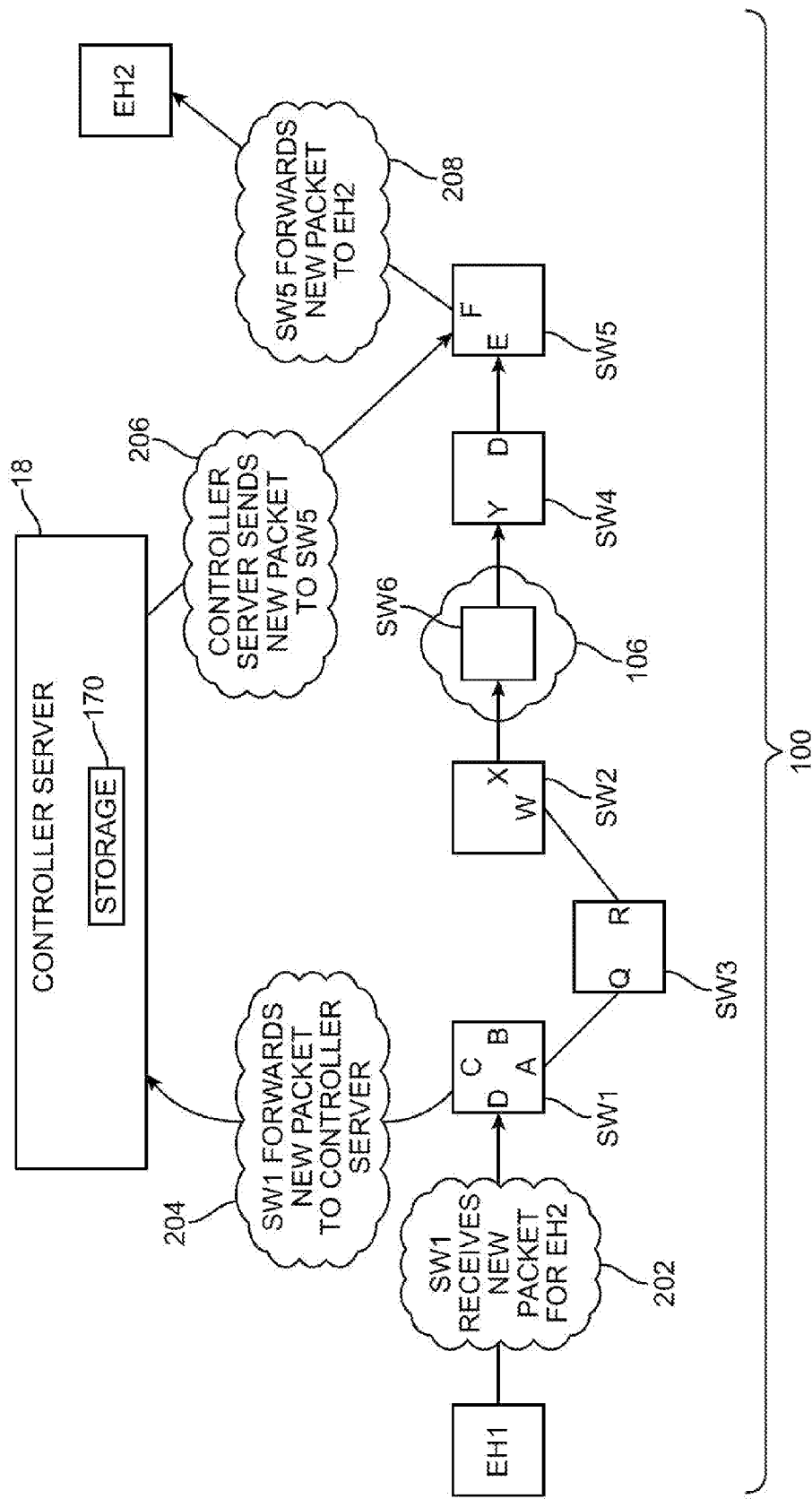
FIG. 9B is a diagram showing illustrative steps that may be performed by a controller server and controller clients to forward a data packet through a network switch path in accordance with an embodiment of the present invention.

To reduce the total cost of transmitting a flow that includes relatively few network packets, the flow may be routed to a packet destination through the controller server. FIG. 9B shows illustrative steps that may be taken to route a new network packet such as the first packet of a flow through a controller server.

In step 202, switch SW1 may receive a new packet from end host EH1 that is destined for end host EH2. Switch SW1 may use a corresponding flow table to identify that the new packet should be sent to controller server 18 (e.g., by identifying that no appropriate entry exists in a corresponding flow table or by identifying a flow table entry that directs switch SW1 to forward the new packet to controller server 18).

In step 204, switch SW1 may forward the new packet to controller server 18 (e.g., via network communications path 66 of FIG. 8).

In step 206, the controller server may identify that the closest client switch to end host EH2 is switch SW5. For example, controller server 18 may use network topology information stored in storage 170 to identify client switch SW5. The controller server may transmit the new packet directly to switch SW5 and instruct switch SW5 to forward the new packet to end host EH2.

In step 208, switch SW5 may forward the new packet to end host EH2 (e.g., by transmitting the packet from port F).

By directly forwarding the new packet to a switch coupled to a packet destination (e.g., to switch SW1 coupled to end host EH1), controller server 18 may bypass intermediate switches in the network (e.g., switches SW3, SW2, SW6, and SW4 in the network switch forwarding path of FIG. 9A). In this way, the forwarding delay of transmitting the new packet through the network may be reduced.

The network cost associated with forwarding the new packet through the controller server may be estimated by the cost function of equation 4.

$$cost_{ctl} = cost_{instructing\ last\ switch\ to\ forward\ new\ packet} + cost_{forwarding\ delay\ of\ last\ switch} \quad (4)$$

As shown in equation 4, the cost of forwarding a single packet through the controller server instead of through a network switch path may include the cost of instructing the last client switch in a data path to forward the packet and the forwarding delay cost associated with the last switch. The cost of instructing the last client switch in the data path may affected by factors such as controller server load or network delay between controller server 18 and the last switch in the network switch forwarding path. For example, network communications path 66 between controller server 18 and the last client switch may include other network equipment that each delay the transmission of control packets from controller server 18 to the last switch. The delay may vary depending on which client switch is the last switch in the network forwarding path (e.g., because each client switch may communicate with controller server 18 over a different network path 66.

As an example, a flow may consist of an ARP request packet transmitted from end host EH1 to end host EH2 and an ARP reply packet transmitted from end host EH2 to end host EH1. The cost associated with the ARP request packet may be estimated by evaluating equation 4 with switch SW5 as the last switch (e.g., because switch SW5 may be the last switch in a forwarding path from end host EH1 to end host EH2). The cost associated with forwarding the ARP reply packet through the controller server may be estimated by evaluating equation 4 with switch SW1 as the last switch (e.g., because switch SW1 may be the last switch in a forwarding path from end host EH2 to end host EH1).

To estimate the total cost of forwarding a sequence of packets (e.g., a flow) through the controller server, the cost function of equation 5 may be calculated.

$$\text{flow\_cost}_{ctl} = \text{num}_{expected\ packets} * \text{cost}_{ctl} \quad (5)$$

As shown by equation 5, the cost of a first packet in a flow may be the same as the cost of subsequent packets in the flow and the total cost of forwarding a flow through the controller server may be equal to the number of expected packets in the flow multiplied by the cost of forwarding a single packet through the controller server.

If desired, packet transmission costs of equations 1-5 may be estimated using an average path length computed for the entire network. For example, the forwarding delay for a given switch may be estimated by the average transmission delay between any two client switches. In this scenario, $\text{cost}_{forwarding\ delay\ of\ last\ switch}$ of equation 4 may be the average transmission delay and $\text{cost}_{forwarding\ delay\ of\ client\ switches}$ of equations 1 and 2 may be the average transmission delay multiplied by the number of client switches in a forwarding path. As another example, $\text{cost}_{forwarding\ delay\ of\ client\ switches}$ may be estimated by the number of client switches in a forwarding path.

The cost variables used in calculating equations 1-5 (e.g., $\text{num}_{expected\ packets}$ and $\text{cost}_{ctl}$ of equation 5) are merely illustrative. Any desired combination of the variables in each equation may be used to estimate the cost of forwarding network packets through a controller server or to estimate the cost of forwarding network packets through a network switch forwarding path. For example, the cost function of equation 1 may be computed with just the flow table setup costs (e.g., $\text{cost}_{flow\ table\ setup}$) or with the combined cost of flow table setup and forwarding delay (e.g., $\text{cost}_{flow\ table\ setup} + \text{cost}_{forwarding\ delay\ of\ client\ switches}$).

To estimate the number of expected packets for any given flow, a controller server such as controller server 18 may be provided with the table of FIG. 10. The table of FIG. 10 may include entries for network protocols that are associated with relatively short-lived flows (e.g., flows that have a relatively small number of network packets). The table of FIG. 10 may be stored as a look-up table (LUT) in storage 170 of FIG. 8 (as an example).

As shown in FIG. 10, each network protocol may have a corresponding expected number of packets per flow. As examples, flows that use the dynamic host configuration protocol (DHCP) to obtain internet protocol (IP) addresses may typically include four packets, flows associated with the address resolution protocol (ARP) may include two packets, flows associated with the domain name system protocol and the user datagram protocol (DNS/UDP) may include 2 packets, and flows associated with the domain name system protocol and the transmission control protocol (DNS/TCP) may include 6 packets. Network protocols for a given flow may be identified by examining header fields in the network packets of that flow. For example, internet protocol (IP) network packets may include IP header fields that describe the network packets. In this scenario, the IP header fields may be examined to identify protocols such as TCP or UDP that are being used by the packets.

The flow cost of forwarding network packets through a controller server and the flow cost of forwarding network packets through a network switch forwarding path may depend on current network characteristics. For example, if a network switch path between a first end host and a second end host is relatively long (e.g., if a packet originating from the first end host must traverse many network switches to reach the second end host) then the forwarding delay cost of traversing the switches may be high. If the forwarding delay cost is high, then the cost of forwarding a flow through the network switch path may be relatively high and it may be desirable to forward the flow through the controller server.

As another example, if the cost of instructing the last switch to forward a packet is relatively high (e.g., because the network path between controller server 18 and switch SW5 in FIG. 8 is relatively long) then the cost of forwarding packets through the controller server may be increased and it may be desirable to forward packets through a network data path.

Figure 11:
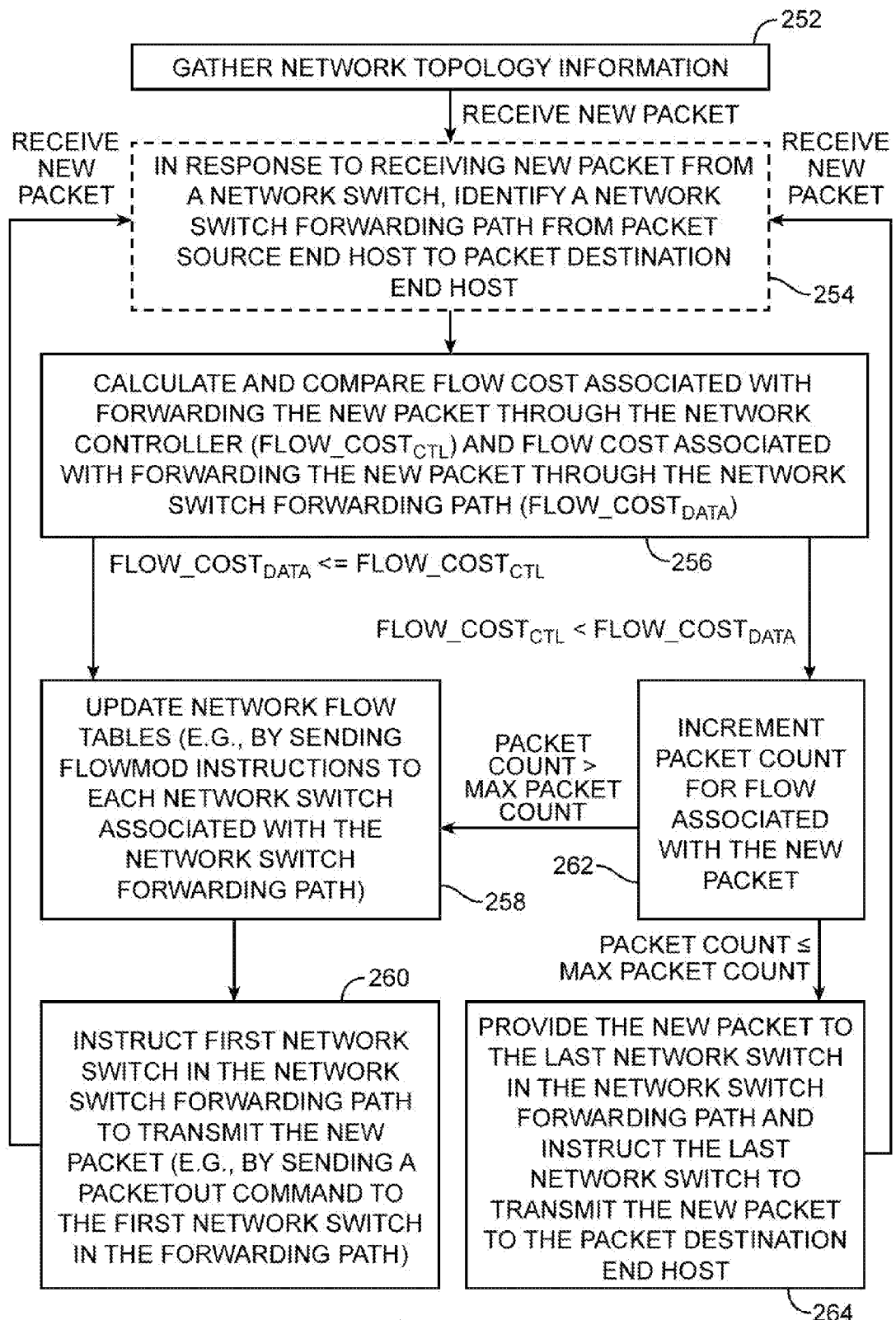
FIG. 11 is a flow chart of illustrative steps that may be performed by a controller server to route network traffic through the controller server in accordance with an embodiment of the present invention.

A controller server such as controller server 18 may improve network efficiency and reduce network packet transmission delay by selecting between network switch path forwarding and controller server forwarding for each flow (e.g., for sequences of packets identified by combinations of packet sources, packet destinations, and network protocols). FIG. 11 shows illustrative steps that may be performed by controller server 18 to improve network efficiency.

In step 252, controller server 18 may gather network topology information. For example, controller server 18 may identify connections between switches and end hosts and identify network switch forwarding paths between end hosts based on the identified connections. If desired, the controller server may store the gathered network topology information in storage 170. In response to receiving a new packet from a client switch (e.g., a packet forwarding system with a controller client), controller server 18 may optionally perform the operations of step 254.

In optional step 254, controller server 18 may determine a data network path based on the network topology information and the received packet. For example, controller server 18 may identify a packet source end host and a packet destination end host from the received packet and use the network topology information gathered in step 252 to determine a network switch forwarding path between the packet source and the packet destination.

In step 256, controller server 18 may determine an expected number of packets in a new flow corresponding to the new packet (e.g., controller server 18 may identify how many network packets are expected between the packet source and packet destination based on network protocols associated with the new packet). Controller server 18 may calculate and compare flow costs associated with forwarding the flow through the controller server and forwarding the flow through the network switch forwarding path (e.g., by calculating flow\_cost$_{ctl}$ of equation 5 and flow\_cost$_{data}$ of equation 3).

If the flow cost for routing the flow through the controller server is greater than the flow cost for forwarding the flow through the network switch forwarding path (e.g., if flow\_cost$_{data}$ <= flow\_cost$_{ctl}$), controller server 18 may generate the network switch forwarding path by performing the operations of step 258.

If the flow cost for routing the flow through the controller server is less than the flow cost for routing the flow through the network switch forwarding path (e.g., if flow_cost$_{ctl}$<flow_cost$_{data}$), controller server 18 may perform the operations of step 262.

In step 258, controller server 18 may update network flow tables to generate the network switch path. For example, the controller server 18 may send flowmod instructions using the OpenFlow protocol to client switches that add or replace flow table entries in a flow table corresponding to that client switch).

In step 260, controller server 18 may instruct the first switch in the network switch forwarding path to transmit the new packet. For example, controller server 18 may send a packetout command using the OpenFlow protocol to the first switch that directs the first switch to send the new packet to the second switch in the network switch forwarding path. Controller server 18 may then return to optional step 254 upon receiving a new packet from a client switch. If desired, controller server 18 may return directly to step 256 (e.g., if network switch forwarding paths between every packet source and packet destination have already been computed and can be retrieved from storage such as storage 170 of FIG. 8).

In step 262, controller server 18 may increment a packet count for the flow associated with the new packet (e.g., the flow of network packets with the same packet source, packet destination, and network protocols as the new packet). If the packet count exceeds a max packet count, controller server 18 may identify that the number of packets associated with the flow have exceeded an expected number of packets. For example, controller server 18 may expect two packets for an ARP flow. In this scenario, if the packet count for the ARP flow exceeds two packets, it may be desirable to set up a network switch forwarding path (e.g., because cost functions 3 and 5 may no longer accurately estimate overhead costs of the ARP flow). Controller server 18 may then perform the operations of step 258 to generate the network switch forwarding path.

If the packet count for the flow remains below the maximum packet count, controller server 18 may perform the operations of step 264 to route the new packet directly to a packet destination end host.

In step 264, controller server 18 may provide the new packet to the last switch in the network switch forwarding path and instruct the last switch to transmit the new packet to the packet destination end host. Controller server 18 may then return to optional step 254 (or directly to step 256) in response to receiving a new packet from a client switch.

Figure 12:
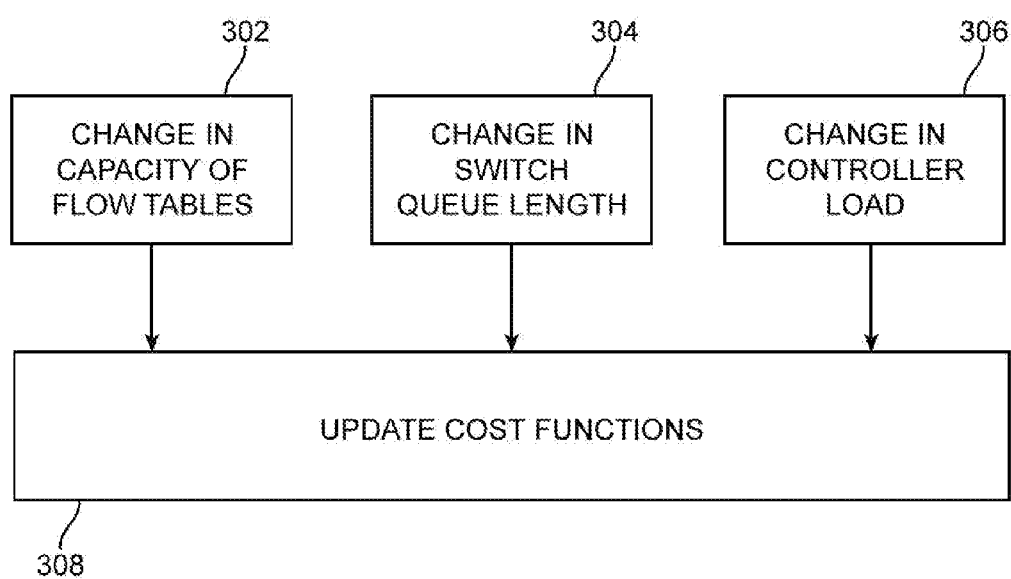
FIG. 12 is an illustrative diagram showing how cost functions may be updated based on network conditions in accordance with an embodiment of the present invention.

Current network conditions may affect the cost of forwarding network packets. FIG. 12 shows an illustrative diagram of how cost functions (e.g., the cost functions of equations 3 or 5) may be updated based on network conditions. As shown in FIG. 11, cost functions may be updated based on changes in the capacity of flow tables, changes in switch queue lengths, and changes in controller load.

Changes in flow table capacity may affect the cost of forwarding flows through network switch paths. For example, if flow tables of client switches are near a maximum entry capacity, then additional entries generated by setting up a network switch path may prevent other network switch paths from being created or disrupt existing network switch forwarding paths. As another example, if flow tables of client switches have sufficient remaining capacity, then the cost of additional flow table entries may be minimal.

Each client switch may have queues that reflect the amount of network traffic currently being routed by that switch. Changes in switch queue lengths may reflect current network traffic conditions. If the switch queue lengths are relatively long, then new packets arriving at the switches may be delayed as packets that are already in the switch queues are processed by the switches. If the switch queue lengths are relatively short, then new packets arriving at the switches may be processed and forwarded relatively quickly. The example of using switch queue lengths to identify network traffic conditions is merely illustrative. If desired, network traffic conditions may be estimated or monitored by other means (e.g., controller server 18 may monitor network traffic conditions).

Changes in network traffic conditions may affect the cost of forwarding network packets through a controller server or through a network switch forwarding path. For example, if network traffic is congested (e.g., if switch queues are long or near maximum queue capacities), then costs associated with transmitting control and/or data packets may be increased.

Controller server 18 may have a limited processing capacity. For example, controller server 18 may perform many functions related to controlling and managing the client switches in the network. If controller server 18 is currently processing many tasks (e.g., if controller server 18 has a relatively high load), then manually forwarding each packet in a flow may generate more work than controller server 18 is capable of handling. In this scenario, it may be desirable for the flow to be forwarded through a network switch path (e.g., because the cost of routing packets through controller server 18 may be greater than the cost of routing the packets through the network switch forwarding path).

If desired, the cost functions may be adjusted based on past flow information. For example, controller server 18 may store information about each flow. The stored information may include the packet source, the packet destination, and number of actual packets for each flow. Controller server 18 may use the stored information to adjust the expected number of packets or adjust network forwarding costs. For example, if past TCP flows between a given packet source and a given packet end host have each included fewer than 6 packets, 6 or fewer packets may be expected for future flows of the same type.

The foregoing is merely illustrative of the principles of this invention and various modifications can be made by those skilled in the art without departing from the scope and spirit of the invention.

What is claimed is:

1. A method of forwarding a set of network packets from a packet source to a packet destination through a network that has a first network switch coupled to the packet source, a second network switch coupled to the packet destination, and a controller server that controls the first and second network switches, comprising:

with the controller server, generating control messages that are different from the set of network packets and sending the generated control messages to the first and second network switches;

with the controller server, receiving a given one of the network packets in the set of network packets from the first network switch;

in response to receiving the given one of the network packets, using the controller server to determine whether to forward the set of network packets to the packet destination through the controller server or whether to establish a path for the set of network packets through the first and second network switches in the network; and in response to determining that the set of network packets is to be forwarded to the packet destination through the controller server, generating control messages that are different from the set of network packets using the controller server and sending the control messages to the first network switch to direct the first network switch to forward the set of network packets from the packet source to the packet destination through the controller server.

2. The method defined in claim 1, further comprising:

in response to determining that the path is to be established, using the controller server to direct the first and second network switches to establish a packet forwarding path through the network between the packet source and packet destination that passes through the first and second network switches.

3. The method defined in claim 2 wherein using the controller server to determine whether to forward the set of network packets to the packet destination through the controller server or whether to establish a path for the set of network packets through the first and second network switches in the network comprises:

evaluating a network switch cost metric indicative of cost associated with forwarding the set of network packets along the packet forwarding path to produce a network switch cost metric value.

4. The method defined in claim 3 wherein using the controller server to determine whether to forward the set of network packets to the packet destination through the controller server or whether to establish a path for the set of network packets through the first and second network switches in the network comprises:

evaluating a controller server cost metric indicative of cost associated with forwarding the set of network packets from the packet source to the packet destination through the controller server to produce a controller server cost metric value.

5. The method defined in claim 4 wherein using the controller server to determine whether to forward the set of network packets to the packet destination through the controller server or whether to establish a path for the set of network packets through the first and second network switches in the network comprises:

comparing the network switch cost metric value to the controller server cost metric value.

6. The method defined in claim 5 wherein evaluating the network switch cost metric comprises identifying a cost associated with establishing flow table entries within the first and second network switches.

7. The method defined in claim 5 wherein evaluating the network switch cost metric comprises identifying a cost associated with transmitting control packets from the controller server to the first and second network switches through the network.

8. The method defined in claim 5 wherein evaluating the network switch cost metric comprises identifying delays associated with forwarding the set of network packets along the packet forwarding path.

9. The method defined in claim 5 wherein evaluating the network switch cost metric and evaluating the controller server cost metric each comprises identifying how many network packets make up the set of network packets.

10. The method defined in claim 9 wherein identifying how many network packets make up the set of network packets comprises identifying how many network packets make up the set of network packets by identifying which network protocol is associated with transmitting the given one of the network packets from the packet source to the packet destination.

11. The method defined in claim 9 wherein identifying how many network packets make up the set of network packets comprises identifying how many network packets make up the set of network packets based on previously forwarded sets of network packets.

12. The method defined in claim 5 wherein evaluating the controller server cost metric comprises identifying delay costs associated with forwarding the set of network packets from the packet source to the packet destination through the controller server.

13. A method of forwarding network packets from a packet source to a packet destination through a network that includes a plurality of switches with corresponding flow tables that control the forwarding of the network packets through the switches, comprising:

with a controller server configured to control the switches, receiving a given one of the network packets from one of the plurality of switches;

in response to receiving the given one of the network packets, determining whether the network packets are to be forwarded through the controller server or whether the network packets are to be forwarded through the plurality of switches;

in response to determining that the network packets are to be forwarded through the controller server, forwarding the network packets from the packet source to the packet destination through the controller server; and in response to determining that the network packets are to be forwarded through the plurality of switches, generating control packets that are different from the network packets and sending the control packets to the plurality of switches to modify the flow tables to establish a packet forwarding path for the network packets.

14. The method defined in claim 13 wherein modifying the flow tables comprises adding flow table entries that direct the switches to forward the network packets along the packet forwarding path.

15. The method defined in claim 13 wherein determining whether the network packets are to be forwarded through the controller server comprises:

evaluating a controller server cost metric indicative of cost associated with forwarding the network packets from the packet source to the packet destination through the controller server to produce a controller server cost metric value.

16. The method defined in claim 15 wherein determining whether the network packets are to be forwarded through the plurality of switches comprises:

evaluating a network switch cost metric indicative of cost associated with forwarding the network packets through the plurality of switches to produce a network switch cost metric value.

17. The method defined in claim 16 wherein determining whether the network packet are to be forwarded through the controller server or whether the network packet are to be forwarded through the plurality of switches comprises comparing the controller server cost metric and the network switch cost metric.

18. A method of forwarding a set of network packets through a network that includes a plurality of switches, comprising:

with a controller server configured to control the plurality of switches, receiving a given one of the network packets in the set of network packets from a given one of the plurality of switches;

in response to receiving the given one of the network packets, determining whether to forward the set of network packets through the controller server or whether to forward the set of network packets through a path that includes at least some of the plurality of switches; and in response to determining that the set of network packets is to be forwarded through the controller server, bypassing at least one of the network switches in the path by generating control messages that are different from the set of network packets and sending the control messages to the given one of the plurality of switches to direct the given one of the plurality of switches to forward the set of network packets through the controller server.

19. The method defined in claim 18 wherein determining whether the set of network packets is to be forwarded through the controller server or whether the set of network packets is to be forwarded through the path that includes at least some of the switches in the network comprises:

evaluating a controller server cost metric indicative of cost associated with forwarding the set of network packets through the controller server to produce a controller server cost metric value; and evaluating a network switch cost metric indicative of cost associated with forwarding the set of network packets through the path to produce a network switch cost metric value.

20. The method defined in claim 19 wherein evaluating the controller server cost metric and evaluating the network switch cost metric each comprise estimating how many network packets are in the set of network packets.

21. The method defined in claim 1, wherein the control messages comprise control packets and wherein sending the control messages to the first and second network switches comprises sending the control packets to the first and second network switches over control paths.

22. The method defined in claim 21, further comprising:
with the controller server, modifying a flow table of the first network switch using the control packets.

23. The method defined in claim 13, further comprising:
with the controller server, generating and sending control packets that are different from the network packets to the plurality of switches, wherein modifying the flow tables comprises modifying the flow tables based on the control packets.

* * * * *